(12) United States Patent
Moorehead

(10) Patent No.: US 6,332,980 B1
(45) Date of Patent: Dec. 25, 2001

(54) SYSTEM FOR SEPARATING ALGAE AND OTHER CONTAMINANTS FROM A WATER STREAM

(76) Inventor: Jack Moorehead, 5355 Mira Sorrento Pl., San Diego, CA (US) 92121

( * ) Notice: Subject to any disclaimer, the term of this patent is extended or adjusted under 35 U.S.C. 154(b) by 0 days.

(21) Appl. No.: 09/524,578

(22) Filed: Mar. 13, 2000

(51) Int. Cl.$^7$ .................................................. C02F 1/24
(52) U.S. Cl. ................... 210/104; 210/109; 210/188; 210/192; 210/195.1; 210/199; 210/205; 210/221.2; 210/202; 261/122.1; 366/338
(58) Field of Search ................. 210/97, 104, 109, 210/192, 195.1, 199, 205, 221.1, 221.2, 200, 202, 188; 261/122.1; 366/336, 338

(56) References Cited

U.S. PATENT DOCUMENTS

| | | | | |
|---|---|---|---|---|
| 2,793,185 | * | 5/1957 | Albrektsson et al. | 210/44 |
| 3,772,190 | * | 11/1973 | Eisenmann | 210/201 |
| 3,966,598 | * | 6/1976 | Ettelt | 210/44 |
| 4,029,578 | * | 6/1977 | Turk | 210/760 |
| 4,094,783 | * | 6/1978 | Jackson | 210/197 |
| 4,156,648 | * | 5/1979 | Kuepper | 210/203 |
| 4,165,360 | * | 8/1979 | Casper et al. | 422/202 |
| 4,211,651 | * | 7/1980 | Thomas | 210/44 |
| 4,627,922 | * | 12/1986 | Viator et al. | 210/704 |
| 4,897,359 | * | 1/1990 | Oakley et al. | 435/313 |
| 5,437,784 | * | 8/1995 | Meinecke et al. | 209/170 |
| 5,736,059 | * | 4/1998 | Mackelvie | 210/774 |
| 6,106,711 | * | 8/2000 | Morse et al. | 210/221.2 |

* cited by examiner

Primary Examiner—Peter A. Hruskoci
(74) Attorney, Agent, or Firm—Frank G. Morkunas

(57) ABSTRACT

A method and apparatus for treating raw influent water to remove particles, algae and toxic chemicals from the water. Basically, air is dissolved in recirculated water under high pressure in an air contactor unit, the air saturated water is intimately mixed with the raw, particle bearing, water in a particle mixing system, and the water, particle and air mixture is passed through an air bubble separator wherein bubbles formed when the pressure on air saturated water is reduced carry away toxic gases and particulate material. If desired for further cleaning the water can be sent through a second series of air contactor, particle mixer and air bubble separation, but with a gas comprising ozone to further remove suspended particles and non-volatile dissolved organic matter. In order to improve mixing of the particles and the air saturated water passing through tubes, preferably a pattern of dimples is formed on at least part of the interior wall of the tubes. Upon completion of the process the water is ready for use or for further filtration in a conventional filtration plant.

32 Claims, 6 Drawing Sheets

SYSTEM FOR SEPARATING ALGAE AND OTHER CONTAMINANTS FROM A WATER STREAM

FIELD OF THE INVENTION

This invention relates in general to systems for removing contaminants from liquids and, more specifically to a system for removing volatile gases, pesticides and particles such as algae, other suspended organic solids, dissolved oils and other particles including large and heavy particles and light, fine or buoyant particles from water.

BACKGROUND OF THE INVENTION

Water supplies for domestic drinking water, process water for chemical plants or other liquids are often contaminated with a variety of contaminants, such as toxic chemicals, algae, dissolved oil and various organic and inorganic particles of various sizes. These contaminants must be removed in a reliable, cost effective manner.

Many older water treatment plants use gravitational separation methods, typically in sedimentation systems or dual-media sand filtration systems that may not be acceptable under the newer water quality standards. In some cases, these systems can meet the standards through the use of properly mixed polymer chemical filter aids. The required expensive and complex polymer chemical mixing equipment requires constant attention, since the amount of the chemicals being added to raw water must be frequently readjusted to match the continually changing chemistry of the water being filtered. Slow sand filters require a considerable investment, but generally can be operate for longer periods without cleaning. Unfortunately, even with pre-treatment, both dual-media and slow sand filters fail to meet water quality standards for hours or several days after each backwash cleaning.

Ordinary chemical flocculation and sedimentation processes do not prevent toxic chemicals, pesticides and algae from passing through the ordinary filter bed. If algae spores are present when chlorine is added, toxic disinfection byproducts are formed, which is highly undesirable and a violation of the USEPA Safe Drinking Water Act. The inability of older municipal filtrations systems to remove algae is apparent in the lack of clarity found when a swimming pool is filled with "clean" tap water. Most pool contractors have to shock tap water with large doses of chlorine chemical pool oxidizer to achieve the desired clear pool water appearance.

Particulate material has also been removed from liquids by floatation, another gravitational method, in which bubbles of a gas, such as air or oxygen, are introduced into the lower levels of the liquid and float to the top, carrying fine particles with them. Various chemical additives, such as flocculation aids, typically alum polymers, are required with these systems. Flotation is a gravitational method because the rise of bubbles is due to the gravitational acceleration acting on the mass of the liquid in accordance with the basic force equals mass time acceleration relationship. A force balance relative to a pocket of gas phase within liquid (a bubble), where the mass of the bubble is its volume times its density, shows that the bubble must rise to find equilibrium, because the density of a gas is generally less than that of a liquid. Large flotation tanks are required to allow adequate time for air bubbles to reach the surface.

Failure to remove algae prior to filtration also leads to clogged filters, increases filter operation costs and wastes water required for frequent filter cleaning cycles. The use of flocculation promoting chemicals increases the volume of sludge to be dewatered and removed.

Thus, there is a continuing need for a separation system that will rapidly and efficiently remove particles and volatile gases from liquids while treating a liquid, will efficiently remove algae and volatile gases such as MTBE during pretreatment prior to filtration and will reduce overall treatment costs and conserves water through less frequent filter cleaning and a smaller sludge volume.

SUMMARY OF THE INVENTION

The above noted problems, and others, are overcome in accordance with this invention by a particle separation system that includes a pretreatment section for economically removing algae and other contaminates prior to filtration. The pretreatment includes injecting millions of extremely small air bubbles per liter into the incoming raw water. This dissolved air flotation technology increases a plants daily capacity and reduces the potential formation of toxic chlorine-chemical and post-treatment byproducts.

Initially, recirculated plant output water under high pressure and air under high pressure are mixed in a an air contactor element, generally consisting of one tank or two or more tanks in series. Preferably, the tank contains a suitable media that provide a high surface areas that increases adsorption of air into the water. All pressures referred to hereinafter are gauge pressures.

The air saturated recirculated water enters a particle mixing system where it is mixed with raw influent water. The mixed water passes along a tubular spiral to cause intimate mixing. Preferably, a pattern of dimples is provided on at least part of the inner wall of the spiral tube, to increase flow turbulence and assure optimum mixing.

The mixed water then passes to an air bubble separator unit where a toroidal flow is induced as the water moves upwardly in the unit, producing a vortex that cause air to move to the center and form an elongated axial air column with the water rotating between the vessel wall and the air column. Heavy solid particles drop to the bottom of the unit. Water largely cleaned of algae and other light particles exits near the top of the unit, with light float particles being removed adjacent to the top of the unit. Air and volatile gases exit at the very top of the unit.

The cleaned water from this air bubble separation unit may be used for many purposes. However, in some cases further removal of the small amount of remaining contaminates is desirable. In that case cleaned water from the air bubble separator then passes to a second air contactor element at a lower, but above atmospheric, pressure. Oxygen, preferably containing a suitable quantity of ozone, is then absorbed or forced into the air contactor tank under pressure higher than the water pressure. The water now containing a suitable quantity of dissolved oxygen/ozone passes to a second particle mixing system similar to the first particle mixing system as described above. As the process water enters the second particle mixing system, hydroxyl radicals(dissolved ozone) are mixed with the remaining suspended particles and non-volatile dissolved organic matter.

Water from the second particle mixing system then passes to a second air bubble separator, similar to the first one as described above. Bubbles with microscopic suspended particles coalesce along the unit centerline due to the vortex effect and are extracted at the top of the unit. The process water, now further cleaned of algae and other organic particles, may proceed to any desired conventional filtration system, where any remaining heavy solid particles are removed. Since the pretreatment system removes over 85% of the suspended solids in the original untreated water, filter cycles will be much longer than before, with much lower operating and filter maintenance costs.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
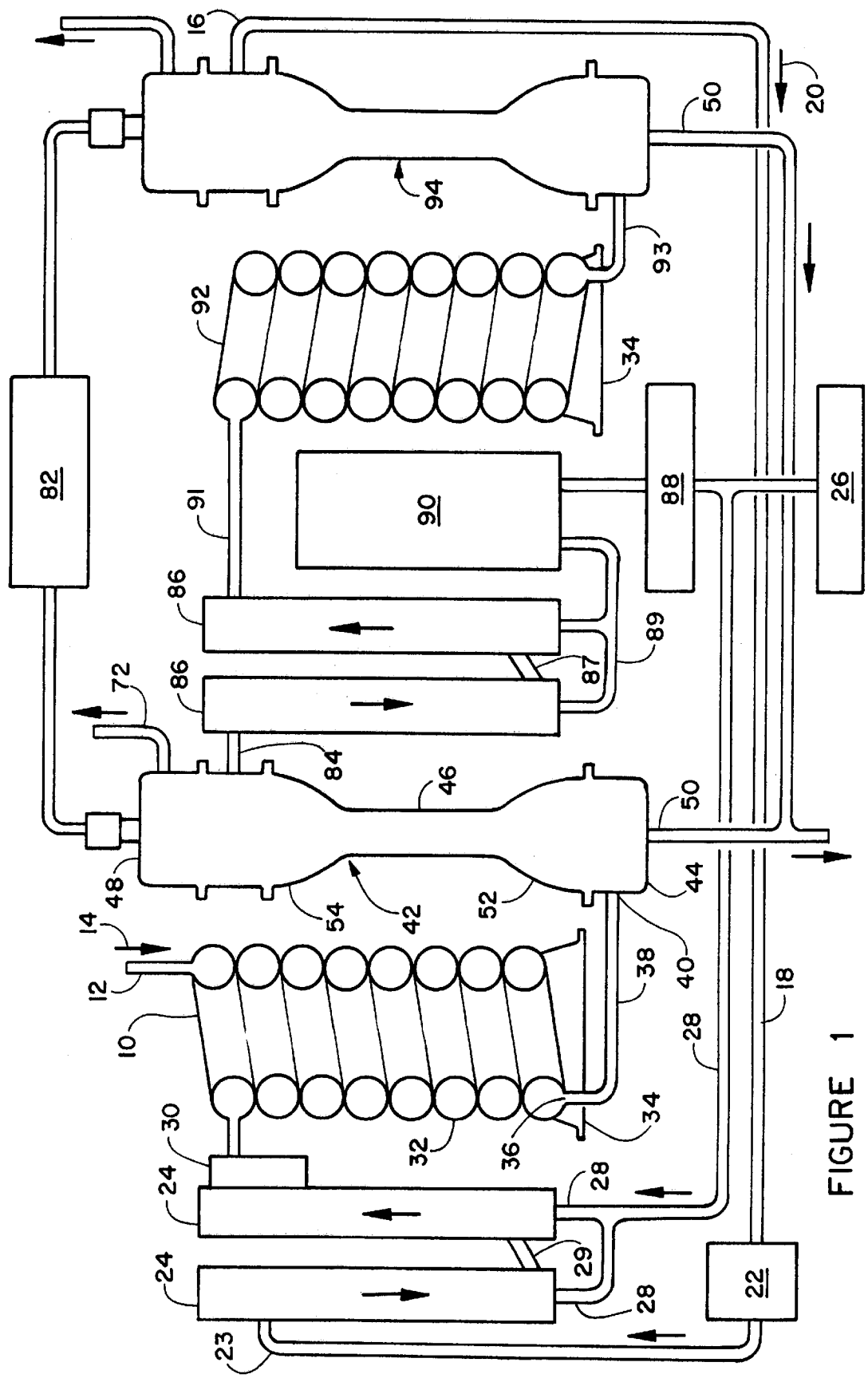
FIG. 1 is a schematic flow diagram, partially in section, of a first embodiment of the pretreatment particle separation system.

A schematic flow diagram for the water treatment system of this invention is provided in FIG. 1. Raw influent water is directed into the particle mixing system 10 (described in detail below) via an inlet pipe 12 as indicated by arrow 14 at any suitable pressure, typically 30 psi. Simultaneously a suitable portion of the product water of the system, passing through system outlet pipe 16, is recirculated through pipe 18 as indicated by arrows 20 to a pump and flowmeter 22 where pressure is substantially increased, typically to about 100 psi.

The high pressure recirculated water passes through pipe 23 to an air contactor arrangement 24 typically including two tanks in series. High pressure air (typically at about 100 psi) is passed from a conventional air compressor 26 through a pipe 28. Air is introduced into the upstream ends of the tanks forming air contactor 24. The air is dissolved in the high pressure water in air contactor 24. Any suitable media may be used in the air contactor tanks to aid in fully saturating the air. For optimum operation, hollow membrane fibers of the sort available from the Dainippon Ink and Chemical Corporation under the Separeo EF 04P designation are preferred. While air contactor 24 preferably comprises two tanks in series, a single tank or more than two tanks may be used, if desired.

Air saturated water passes out of air contactor 24 through a pressure regulator 30 which reduces pressure to a suitable degree. A pressure of 25 to 35 psi is preferred, with about 30 psi being optimum. The air saturated water from air contactor 24 is mixed with the raw water in particle mixing system 10.

Figure 2:
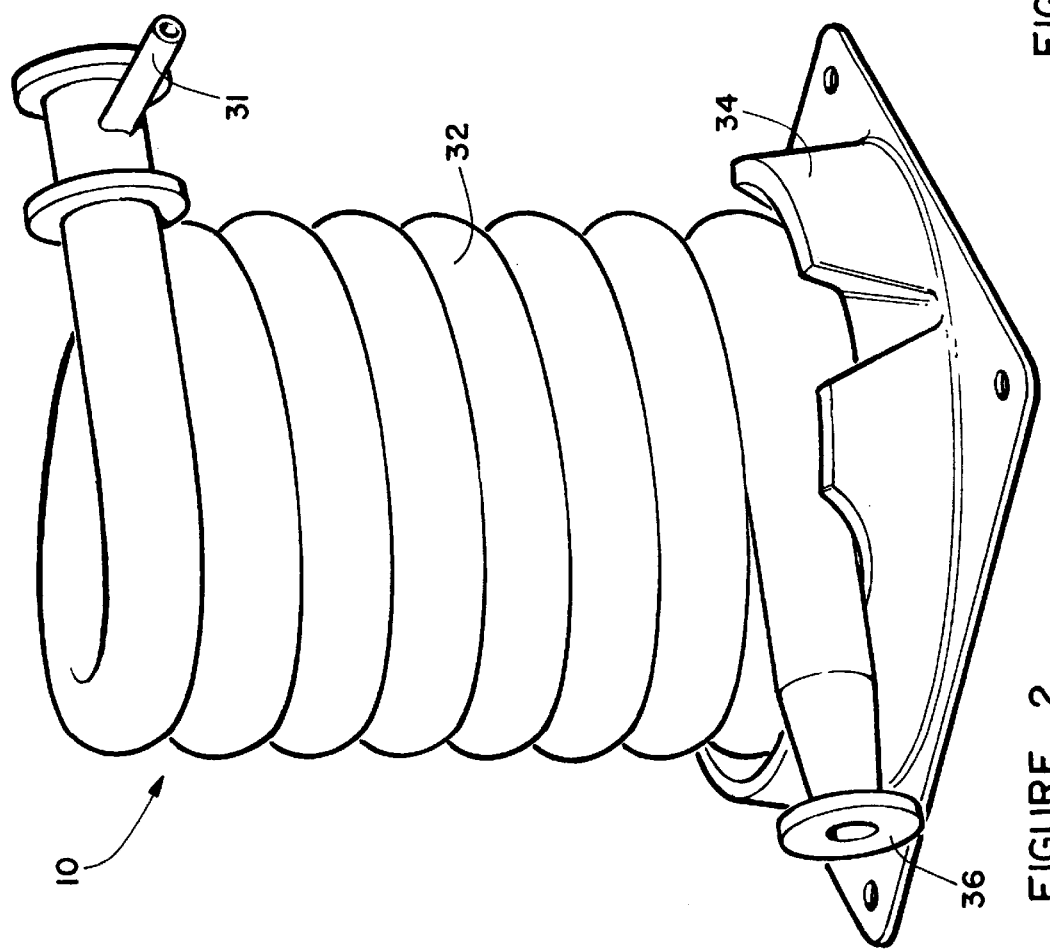
FIG. 2 is a perspective view of the particle mixing system.

Particle mixing system 10 as seen in FIG. 2 basically comprises a helical tube 32 within which the raw water and air saturated water mixes. The diameter of tube 32, the diameter of the helix and the length of tube 32 will depend on the volume of water to be treated. In a typical system, tube 32 will have a diameter of from about 4 to 10 inches, a length of about 70 to 100 feet, with the helical coil having a diameter of from about 2 to 6 feet.

Figure 8:
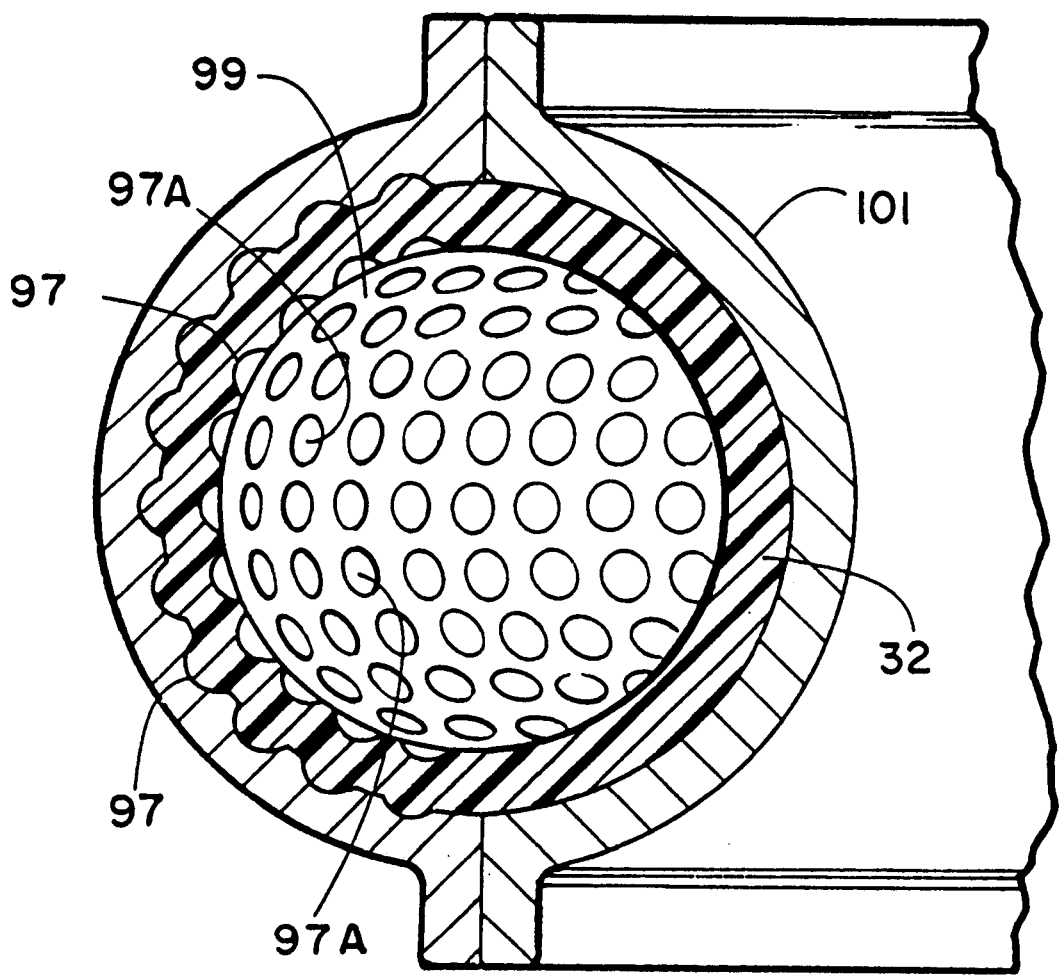
FIG. 8 is a detail cross sectional view through a rotationally formed particle mixing system tube in a forming mold.

In order to achieve optimum turbulence to ideally mix the raw water and the air saturated water, I have found that a pattern of dimples 97 (as shown in FIG. 8) should be provided over at least a large portion of the inner wall surface of tube 32. Also, output pipe 36 from the particle mixing system should have these dimples 97 on the interior wall surface.

The particle mixing system may be manufactured in any suitable manner. Preferably, the helical tube arrangement will be formed by conventional rotational casting, using an outer mold half 101 outside the helix and an inner helical mold portion 99 within the helix having raised bumps 97A to create the dimples 97 on the tube, as shown in detail in FIG. 8. Regardless on the manner, the tube 32 may be thus supplied with dimples over almost the entire inner surface. Base 34 that supports helical tube 32 may be formed in any suitable manner, such as vacuum forming.

Returning to FIG. 1, output from helical tube output 36 passes through pipe 38 to inlet 40 of air bubble separator 42. Millions of very tiny bubbles will form during mixing in particle mixing system 10 when pressure drops from typically 100 psi in air contactor 24 to typically 30 psi at pressure regulator 30. These tiny bubbles adhere to small light weight particles and carry the particles upwardly in air bubble separator 42.

Figure 3:
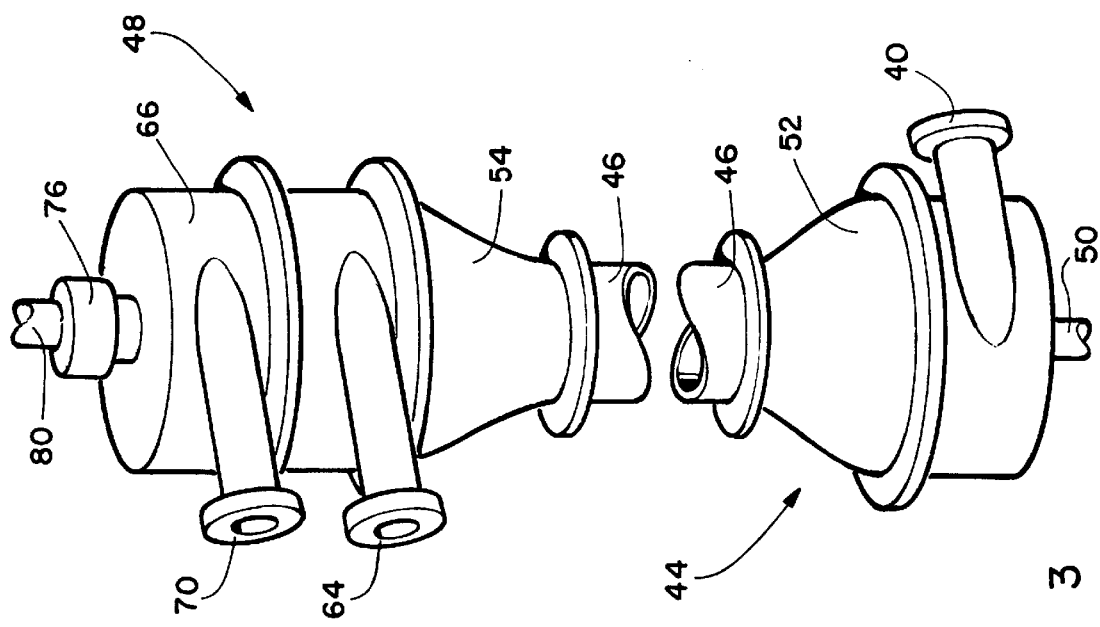
FIG. 3 is a perspective view of the air bubble separator.
Figure 5:
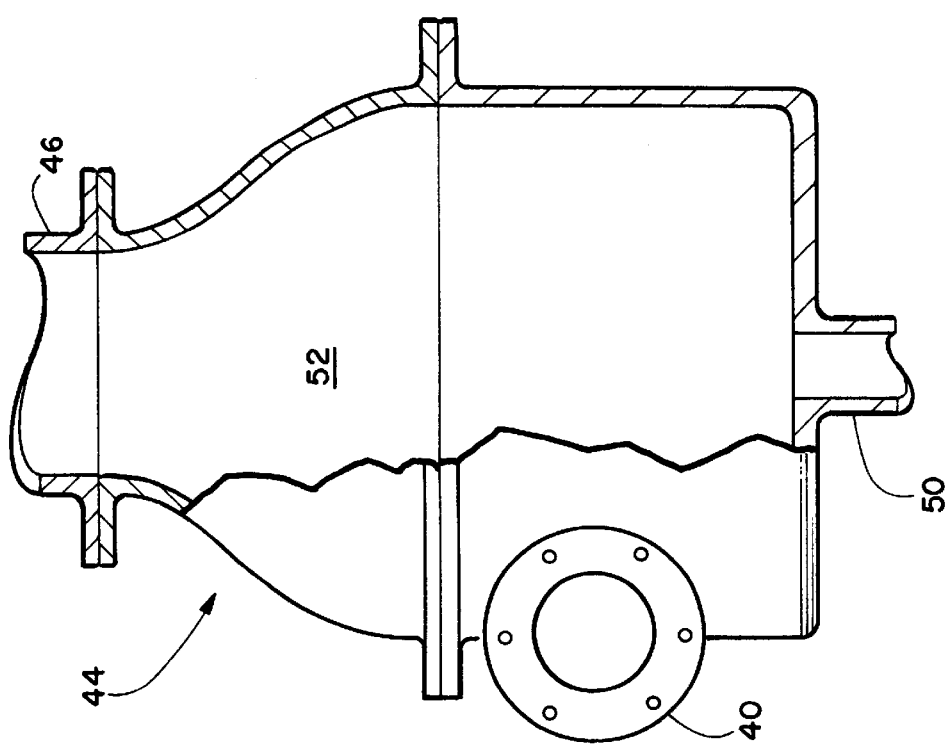
FIG. 5 is an axial section view of the lower portion of the air bubble separator of FIG. 4.
Figure 4:
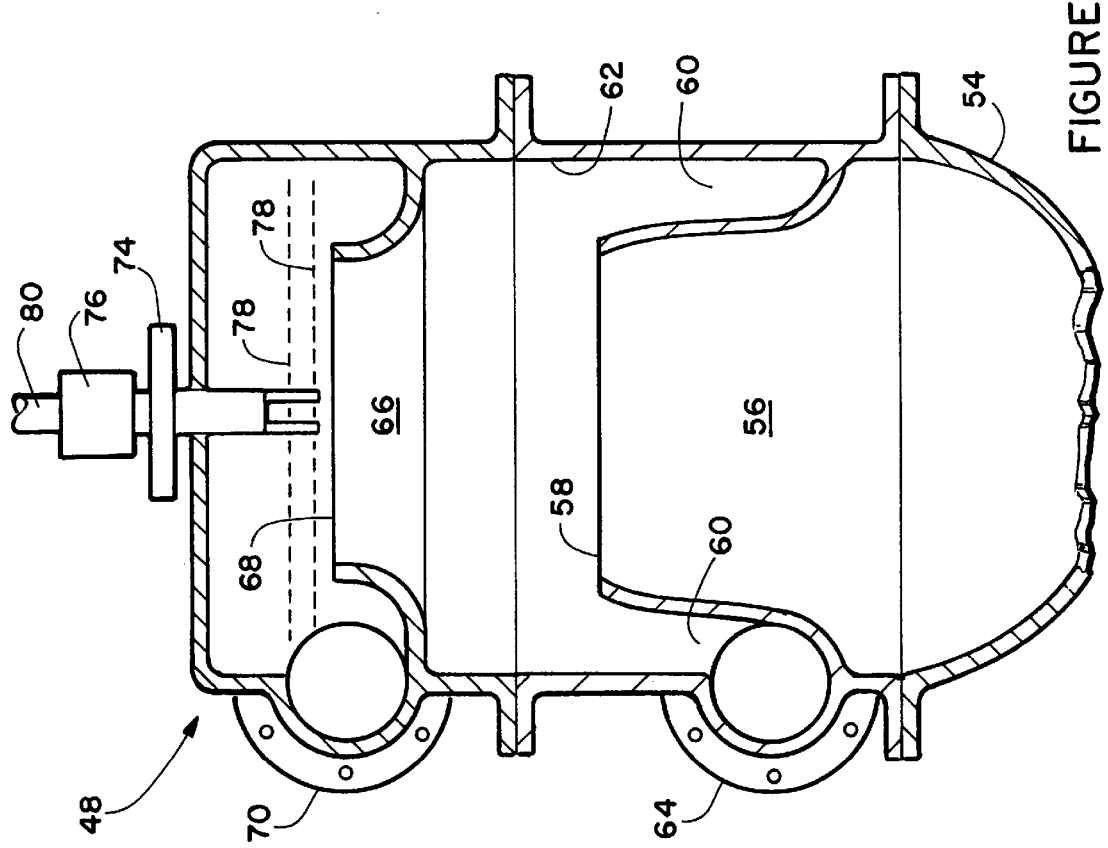
FIG. 4 is an axial section view of the upper portion of the air bubble separator of FIG. 4.

Air bubble separator 42 consists of a lower section 44 as seen in FIGS. 3 and 5, a central section 46 seen in FIGS. 3 and 4 which is generally tubular and may be formed from a transparent material such as glass or an acrylic resin to permit observation of flow therethrough and an upper section as seen in FIGS. 3 and 5.

The mixture of water and air enters tangentially through inlet 40, setting up a spinning vortex of water flowing upwardly though center section 46, creating a boundary-layer transfer effect much like the laminar flow created as water flows through a pipe. More than one inlet 40 may be used if desired. Inlet 40 may have any suitable end or nozzle configuration. Each "boundary" layer of water molecules moves slower because of the frictional drag created by the slower moving layers closer to the center of the column. Heavier particles settle in the sump at the lower end of the lower section 46 and can be drawn off from time to time through a drain opening 50. Millions of very tiny bubbles form as the saturated water enters the lower section. The flowing stream of water and tiny bubbles has the appearance of milk.

Velocity of the spiraling white-water stream accelerates as it flows upwardly through the reducing bell-like chamber 52, creating a high-pressure zone around the outer parameter of the column and a low-pressure zone in the center of the vortex. Differential pressure between the outer wall and the vortex center increases substantially in center section 46. Boundary layer friction causes the shape of the microscopic bubbles to flatten. This slower boundary layer frictional drag across the bubble's high pressure surface side elongates the bubble, which is pulled towards the center vortex. Flattened microscopic air bubbles passing through multiple boundary layers collide with relatively stationary suspended particles in the spiraling stream. Positively charged polymers and flocculents and microscopic air bubbles attach to a the particles, forcing them to the center. Millions of these microscopic air bubbles "float" horizontally towards the low-pressure center of the vortex and tend to coalesce there. This moving "screen" of microscopic bubbles cleans the water in the water annulus and outer perimeter areas as the flow spirals upward.

Velocity of the spiraling water column is reduced as it enters the expansion bell chamber 54. Laminar friction holds gases and the concentrated buoyant float particles near the center of the vortex until they reach the top of the column.

Particles and gases stripped from the clean water around the perimeter of upper section 48 form a concentrated slurry in the center of the vortex as it enters the float chamber 56. Only small microscopic bubbles remain near the outer diameter as the water column flows upwardly. As best seen in FIG. 4, a narrow band of water near weir lip 58 flows over the edge of the weir lip, exiting through the product water discharge port 64, typically at a rate of about 50 to 200 gpm.

The spinning slurry of buoyant suspended particles and air bubbles enters the waste float removal chamber 66 and flows over the edge of waste trough 68, exiting the separator 42 through waste outlet 70, typically at about 5 to 20 gpm to wasted disposal through pipe 72 (FIG. 1).

A conventional level controller 74 activates an air relief valve 76 at the top of separator 42, regulating the surface level of the water-air interface inside the top of the water column. Air relief valve 76 closes as the water level rises and opens when gasses accumulating at the top of the column causes the surface water level inside separator 42 to drop. This maintains the surface level between broken lines 78, correspondingly between the top and bottom of the waste-float outlet 70.

Gases exiting through air relief valve 76 pass through pipe 80 to a conventional volatile gas recovery unit 82 (FIG. 1) for recovery, typically with a carbon filter.

At this point, the water generally has had nearly all contaminants removed and can be passed to a conventional water plant filtration system via output pipe to remove any remaining large particles. However, in this embodiment a second stage is added as seen in FIG. 1.

Where the additional cleaning of the water is desired, output pipe 84 is connected to a second contactor unit 86, basically the same as air contactor 24. However here air from air compressor 26 is passed to a conventional oxygen concentrator 88. Oxygen concentrator 88 increases the proportion of oxygen in the gas to about 60 to 90 per cent. Next the gas goes to a conventional corona discharge type ozone generator 90 where a suitable percentage of the oxygen is converted to ozone. The resulting high ozone gas is fed to contactor 86 at typically about 35 psi, with the water in the contactor typically at about 30 psi.

As the mixture of water and ozone containing gas is directed to a second particle mixing system 92, basically the same as particle mixing system 10 described above, where hydroxyl radicals (dissolved ozone) are mixed with any remaining suspended particles and non-volatile dissolved organic matter.

The output of second particle mixing system 92 passes through pipe 93 to a second air bubble separator 94 generally the same as air bubble separator 42, as described above. Preferably, a pattern of dimples is provided over the internal surface of pipe 93 to increase turbulence and the resulting improved mixing, as discussed above. The coalesced partially oxidized suspended buoyant particles and volatile gases are extracted by the vortex in separator 94 and pass to gas recovery unit 82 via pipe 96. This prefiltration process removes over 85% of the suspended solids from the treatment plant process water flow. Also, substantially all algae is removed. This is sufficient to meet present US EPA Clean Water Act regulations for a minimum 85% removal of suspended solids. Where further removal is desired, the output water from particle mixing system 92 can be passed through pipe 16 to any conventional filtration system.

As mentioned above, I have found that forming a pattern of dimples on a suitable portion of the interior of tubes 32 in particle mixing systems 10 and 92 and in pipes 38 and 93 will significantly improve turbulence therein and greatly improve mixing of water with the added gases in the two particle mixing systems 10 and 92.

Figure 6:
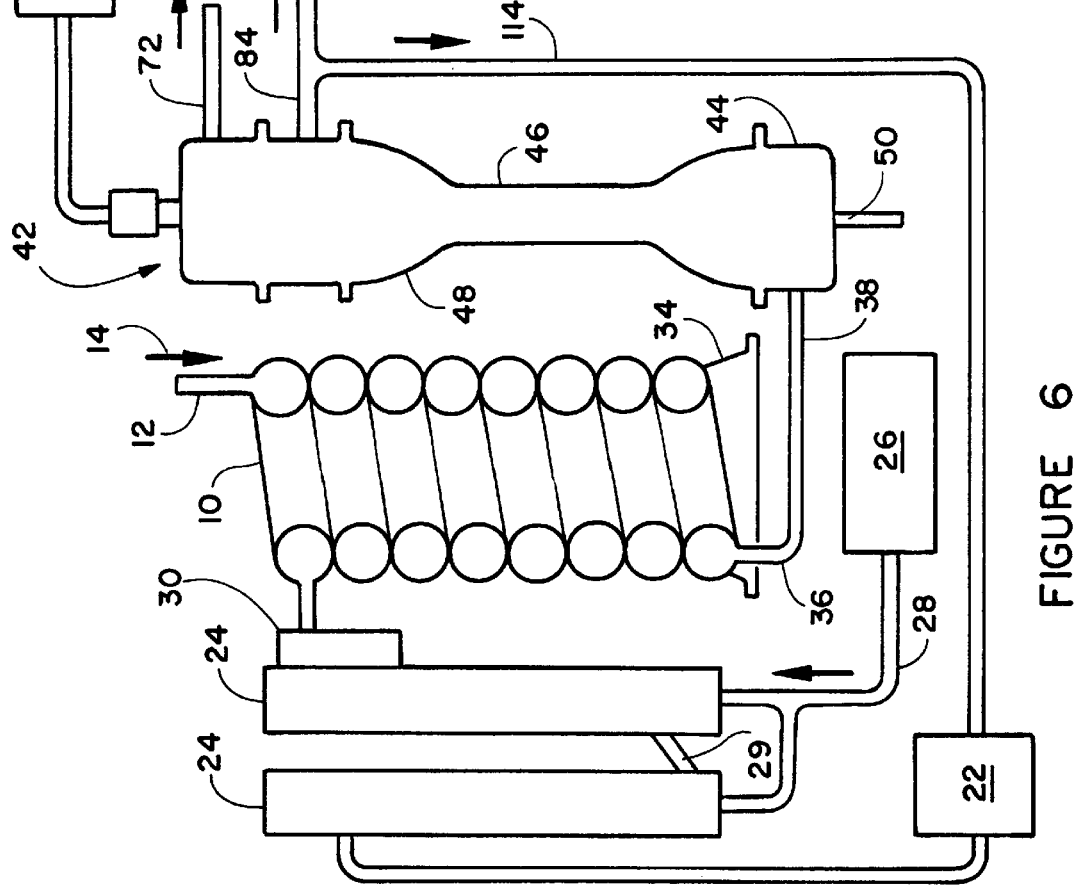
FIG. 6 is a schematic flow diagram, partially in section, of a second embodiment of the pretreatment particle separation system.

FIG. 6 illustrates an alternative embodiment using a single cleaning stage with the saturated air and eliminates the second, ozone treatment stage shown in FIG. 1.

As seen in FIG. 2, the air contactor 24, particle mixing system 10 and air bubble separator 42 are essentially identical to the first stage of FIG. 1. Air from compressor 26 is directed to air contactor 24 together with recirculated water from clean water output line 84 from air bubble separator 42.

Saturated water from air contactor 24 passes to particle mixer 10 where bubbles form and pick up buoyant particles. Water and bubbles from air contactor 24 then passes to air bubble separator 42. There, heavy particles are drained away through drain 50, waste water with buoyant particles passes out through waste pipe 72 and gasses are passed out through pipe 80 to gas recovery unit 82. Clean water passes out through pipe 84 to and further filtration treatment, storage or use.

Water is recirculated through pipe 114 to pump 22 and enters air contactor 24 to continue the process. The clean water from pipe 84 is suitable for many purposes, such as some process water for manufacturing facilities and the like. For higher purity purposes, the system shown in FIG. 1 is preferred.

Figure 7:
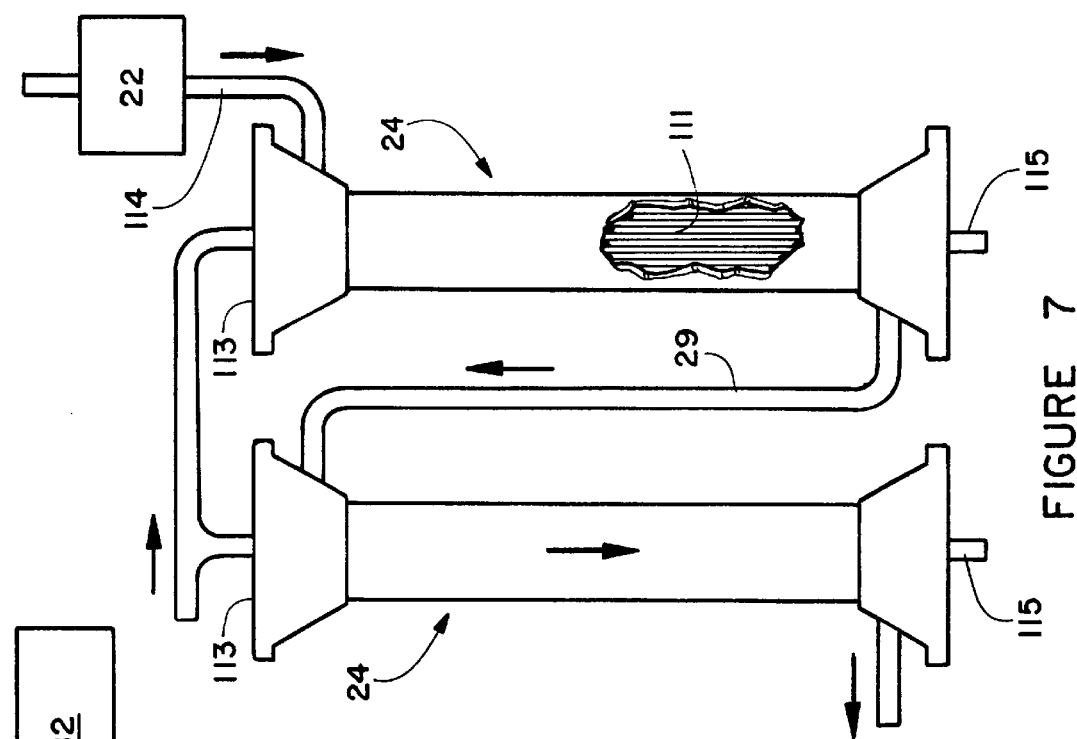
FIG. 7 is a detail elevation view, partially cut away, of an alternate preferred air contractor flow arrangement.

FIG. 7 illustrates an alternate flow path for air and recirculated water through the air contactor unit. Each unit 24 comprises a cartridge having a very large number of thin, porous, tubes 111 connected to a manifold 113 at the top of each unit 24 so that air enters all of tubes 111. Meanwhile, recirculated water enters the top of one unit 24, flows between tubes 111, out the bottom and to the top of the second unit 24 through pipe 29, thence between tubes the same as tubes 111 and out the bottom of the second unit 24 via pressure regulator 30 to the particle mixing system 10. Air or oxygen forced, by means of an air compressor 26 (as shown in FIGS. 1 and 6), through the open pores in tubes 111 is adsorbed by the recirculating water flow as it passes over the open pores. Conventional sensors 115 at the bottom of units 24 sense an accumulation of air at the bottom of the unit and open a valve in the sensor to bleed off the air.

Figure 10:
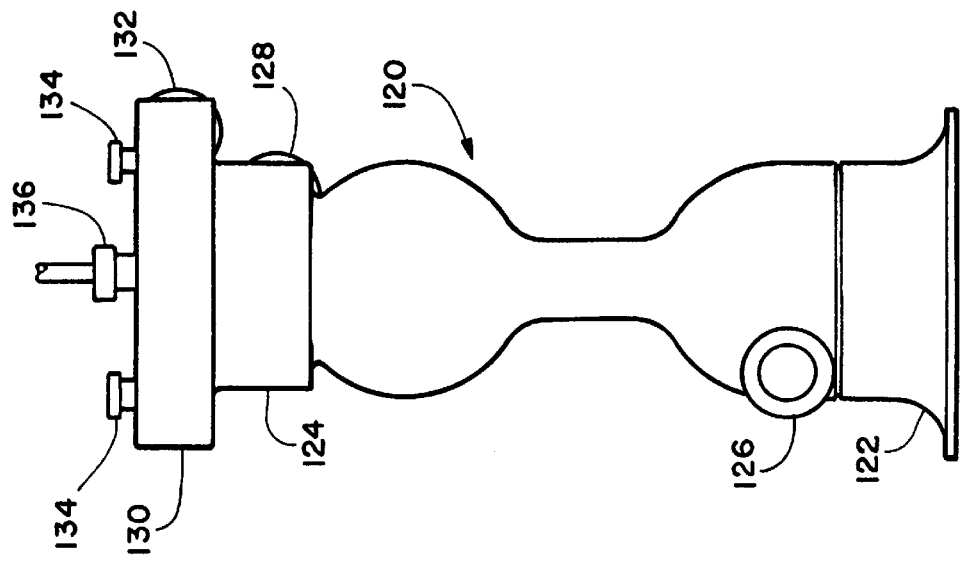
FIG. 10 is a side elevation view of the air bubble separator of FIG. 9.
Figure 9:
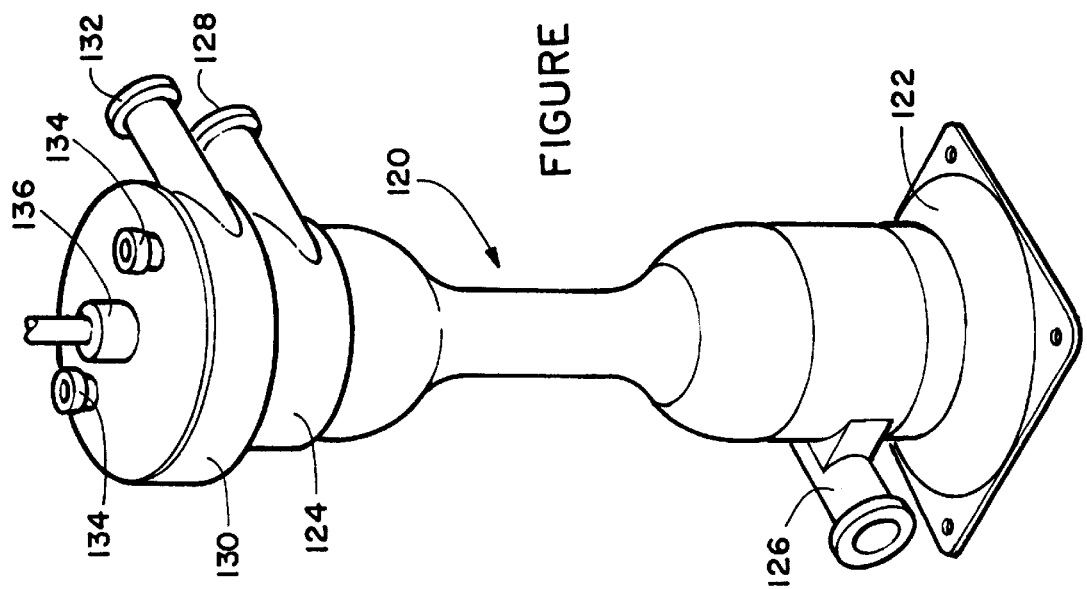
FIG. 9 is a perspective view of an alternative embodiment of an air bubble separator.

FIGS. 9 and 10 illustrate an alternative embodiment of an air bubble separator system. Here air bubble separator includes a single piece, unitary housing 120 preferable formed by conventional rotational molding. A base 122 may be formed at the same time housing 120 is formed or may be formed separately and secured to the housing, such as by adhesive bonding. Water from the particle mixing system is injected into the air bubble separator through a tangential inlet 126. An upper portion 124 of housing 122 has a cylindrical configuration with an outlet 128 through which clean water is released. At the top is a wider top portion 130, typically 10 to 50% wider than the adjacent upper portion 124, having an outlet 132. Two level sensors 134 are provided in top portion 130 to measure the water level.

Typically, level sensors 134 may be NK ultrasonic level switches from the Kobold company. A gas vent 136 is provided to vent toxic gases and the like. As discussed above, one of sensors 134 will open gas vent 134 when the water level is low to release gas and the other will close the gas vent when water level is high.

Unit 120 may be formed from any suitable plastic material, such as a polyolefin or an acrylic. This embodiment is easily and rapidly manufactured by rotational molding and is highly resistant to corrosion or other damage from constituents of the water mixture being processed.

Other applications, variations and ramifications of this invention will occur to those skilled in the art upon reading this disclosure. Those are intended to be included within the scope of this invention, as defined in the appended claims.

What is claimed is:

1. Water decontamination apparatus which comprises:
    an air contactor means for introducing air into recirculated water at a pressure of at least about 70 psi to substantially saturate water therein;
    a particle mixer for receiving and mixing said saturated water from said gas contactor means with influent water containing at least some contaminants to be removed;
    means for directing said water from said air contactor means to said particle mixer at a pressure less than said gas contactor pressure so that a plurality of very small bubbles form in said particle mixer;
    an air bubble separator having a water inlet adjacent to its bottom for receiving water from said particle mixer;
    said air bubble separator comprising means for causing vortex rotation of received water for coalescing said bubbles and entrained particles along an axis and causing decontaminated water to move along an outer wall of said air bubble separator;
    first outlet means for removing said coalesced bubbles and any entrained particles;
    second outlet means from said air bubble separator for removing said decontaminated water;
    means for removing gases from said bubble separator; and
    means for directing a portion of said decontaminated water from said second outlet to said air gas contactor means as said recirculated water.

2. The apparatus according to claim 1 wherein said gas contactor means includes a plurality of hollow porous tubes and includes means for directing said air into said tubes and said recirculated water into spaces between said tubes so that said air moves through said porous tubes and is adsorbed by said recirculated water.

3. The apparatus according to claim 1 further including a pressure regulator for maintaining pressure at a predetermined level in said gas contactor means prior to passage of said saturated water to said particle mixer.

4. The apparatus according to claim 3 wherein said pressure is maintained at about 100 psi.

5. The apparatus according to claim 1 wherein said particle mixer comprises an elongated helical tube coil, the internal surface of said tube coil having a predetermined pattern of dimples over at least a portion of said surface.

6. The apparatus according to claim 1 wherein said air bubble separator comprises a vertically oriented tube having a central axis, an outer wall and upper and central sections above said lower section with a water outlet in said upper section.

7. The apparatus according to claim 6 wherein said water inlet is oriented at a predetermined angle so that a rotating water vortex is formed and said lower section comprises a sump below said water inlet for collecting heavy particles and a drain for periodically removing said heavy particles.

8. The apparatus according to claim 6 wherein said central section has a diameter less than that of the upper and lower sections and includes gradual transitions therebetween.

9. The apparatus according to claim 6 wherein said upper section includes a weir over which water rotating in said vortex along said outer wall flows into a circumferential product trough and a water outlet means for removing water from said product trough.

10. The apparatus according to claim 6 wherein said upper section further includes a waste trough for receiving floating waste and a waste outlet means for removing said floating waste.

11. The apparatus according to claim 6 wherein said upper section includes a gas relief means for removing gases from said upper section and level controller means for maintaining a predetermined water level in said upper section.

12. The apparatus according to claim 6 wherein said particle separator is a unitary rotationally molded structure comprising a tubular column having a central region narrower than end regions, an approximately cylindrical upper section having an outlet for decontaminated water, an approximately cylindrical top section having an outlet for coalesced air bubbles and entrained contaminants.

13. The apparatus according to claim 12 further including a gas relief valve in said top section for releasing gases.

14. The apparatus according to claim 13 further including level sensor means for sensing the level of water in said top section and for opening said valve when water level reaches a predetermined low level and for closing said valve when water level reaches a predetermined high level.

15. The apparatus according to claim 1 further including air compressor means for supplying air at a predetermined pressure to said gas contactor means.

16. The apparatus according to claim 1 wherein said means for directing water from said particle mixer to said air bubble separator comprises pipes having an internal surface with dimples over at least a portion thereof.

17. Water decontamination apparatus which comprises:
    a first gas contactor means for introducing air into recirculated water at a pressure of at least about 70 psi to substantially saturate water therein;
    a first particle mixer for forming a mixture of saturated water from said first gas contactor means with influent water containing at least some particles to be removed;
    means for directing said saturated water from said first gas contactor means to said first particle mixer;
    means for directing said influent water to said first particle mixer at a pressure less than said first gas contactor pressure so that a plurality of very small bubbles form in said particle mixer;
    a first air bubble separator having a water inlet adjacent to its lower section for receiving said mixed water from said first particle mixer;
    said first air bubble separator comprising means for causing vortex rotation around an axis of received water for coalescing said bubbles along said axis;
    means for removing said coalesced bubbles and any entrained material from said first air bubble separator;
    first water outlet means from said first air bubble separator;
    means for removing gases from said bubble separator; and
    a second gas contactor means for receiving water from said first water outlet means;

means for introducing a gas comprising oxygen and ozone into a second gas contactor means to produce a plurality of very small dissolved bubbles;

a second particle mixer for receiving water from said second gas contactor means;

a second bubble separator comprising means for coalescing said bubbles along an axis;

second means for removing said coalesced bubbles and any entrained material;

second outlet means for removing treated water from said second bubble separator; and means for directing a predetermined portion of said treated water back to said first particle mixer as said recirculated water.

18. The apparatus according to claim 17 wherein said gas contactor means includes a plurality of hollow porous tubes and includes means for directing said air into said tubes and said recirculated water into spaces between said tubes so that said air moves through said porous tubes and is adsorbed by said recirculated water.

19. The apparatus according to claim 17 further including a pressure regulator for maintaining pressure at a predetermined level in said means for directing water from each of said first and second gas contactor means to said first and second particle mixers, respectively.

20. The apparatus according to claim 19 wherein said pressure is maintained at about 100 psi.

21. The apparatus according to claim 17 wherein each of said first and second particle mixers comprises an elongated helical tube coil, the internal surface of said tube coil having a predetermined pattern of dimples over at least a portion of said internal surface.

22. The apparatus according to claim 17 wherein said first and second bubble separators each comprises a vertically oriented tube having a central axis, an outer wall and upper and central sections above said lower section with a water outlet in said upper section.

23. The apparatus according to claim 17 wherein each said water inlet is oriented at a predetermined angle so that a rotating water vortex is formed and said each said lower section comprises a sump below said water inlet for collecting heavy particles and a drain for periodically removing said heavy particles.

24. The apparatus according to claim 17 wherein each said first and second central sections has a diameter less than that of the upper and lower sections and includes gradual transitions therebetween.

25. The apparatus according to claim 17 wherein each said first and second upper sections includes a weir over which water rotating in said vortex along said outer wall flows into a circumferential product trough and a water outlet means for removing water prom said product trough.

26. The apparatus according to claim 17 wherein each said first and second upper section further includes a waste trough for receiving floating waste and a waste outlet means for removing said floating waste.

27. The apparatus according to claim 17 wherein each said first and second upper sections includes a gas relief means for removing gases from said respective upper sections and level controller means for maintaining a predetermined water level in said respective upper sections.

28. The apparatus according to claim 17 further including air compressor means for providing high pressure air to said first and second gas contactor means and including oxygen concentrating means and ozone generator means between said air compressor and said second gas contactor means.

29. The apparatus according to claim 17 wherein said means for directing water from each said first and second particle mixers to each said first and second gas bubble separators comprises pipes having an internal surface with dimples over at least a portion thereof.

30. The apparatus according to claim 17 wherein said particle separator is a unitary rotationally molded structure comprising a tubular column having a central region narrower than end regions, an approximately cylindrical upper section having an outlet for decontaminated water, an approximately cylindrical top section having an outlet for coalesced air bubbles and entrained contaminants.

31. The apparatus according to claim 30 further including a gas relief valve in said top section for releasing gases.

32. The apparatus according to claim 30 further including level sensor means for sensing the level of water in said top section and for opening said valve when water level reaches a predetermined low level and for closing said valve when water level reaches a predetermined high level.

* * * * *